Patented Dec. 8, 1925.

1,565,196

UNITED STATES PATENT OFFICE.

VITTORIO PIANA, OF CHIAVAZZA, ITALY, ASSIGNOR TO CUGNOLIO PIANA AND C., OF CHIAVAZZA, BIELLA, ITALY.

TREATMENT OF SILK SHREDS.

No Drawing.  Application filed March 21, 1923.  Serial No. 626,705.

*To all whom it may concern:*

Be it known that I, VITTORIO PIANA, subject of the King of Italy, residing at Chiavazza, Biella, Italy, have invented certain new and useful Improvements in the Treatment of Silk Shreds, of which the following is a specification.

It is known that in the gathering of cocoons a large amount of shreds is produced, these shreds comprising floss silk mixed with wooden chips, leaves, straws, and other foreign vegetable matters, which remain attached to said silk when the cocoons are picked up and carried away, after said operation a large amount of silk being left attached to said foreign matters and being thus more or less incapable of use.

The present invention has for its object a method for treating said waste floss silk for the purpose of purifying it from said vegetable matters.

According to the present invention the shreds including silk and vegetable material are introduced in a chamber or container and then this chamber is heated from outside to produce within it a temperature sufficiently high to make said foreign vegetable matters very dry and friable while the silk is left unaffected, this silk being of course, in raw state.

Preferably the chamber or container is held closed during the operation.

The operation is carried out with advantage between temperatures of 100° C. and 200° C. but of course this invention does not restrict to a treatment within said temperature ranges; the temperature may of course be any one at which the silk is not affected while the foreign vegetable matters are carried in a very dry and friable condition.

The duration of the treatment in the above stated conditions of temperature is conveniently of about 2 (two) to 3 (three) hours.

The shreds which have been treated in the above described manner are then carried in a crusher or in any other apparatus adapted for hacking or pulverizing the said foreign matters which have been made dry and friable by the heating treatment; a roller crusher may be used for this purpose.

By the treatment in said crushing or like apparatus the said foreign matters are reduced in the state of a very fine powder which separates from the silk, this latter being left unaffected and free from impurities.

What I claim as my invention and desire to secure by United States Letters Patent is:—

1. A method of recovering silk from silk crop waste, comprising, treating silk crop waste in a closed chamber heated from the outside to a temperature at which the vegetable matter usually mixed with silk crop waste is made dry and friable, and then subjecting the waste to a crushing operation and separating the silk from the pulverized vegetable matter.

2. A method of recovering silk from silk crop waste, comprising, treating silk crop waste in a closed chamber heated from the outside to a temperature between 120° and 160° C., and then subjecting the waste to a crushing operation and separating the silk from the pulverized vegetable matter.

3. A method of recovering silk from silk crop waste, comprising, treating silk crop waste in a closed chamber heated from the outside to a temperature between 120° and 160° C., for a period of from two to three hours, and then subjecting the waste to a crushing operation and separating the silk from the pulverized vegetable matter.

In testimony whereof, I have signed my name to this specification.

VITTORIO PIANA.